No. 738,795. PATENTED SEPT. 15, 1903.
G. W. HARDIN & J. D. MEAD.
COTTON STALK PULLER.
APPLICATION FILED MAY 29, 1903.
NO MODEL. 2 SHEETS—SHEET 2.
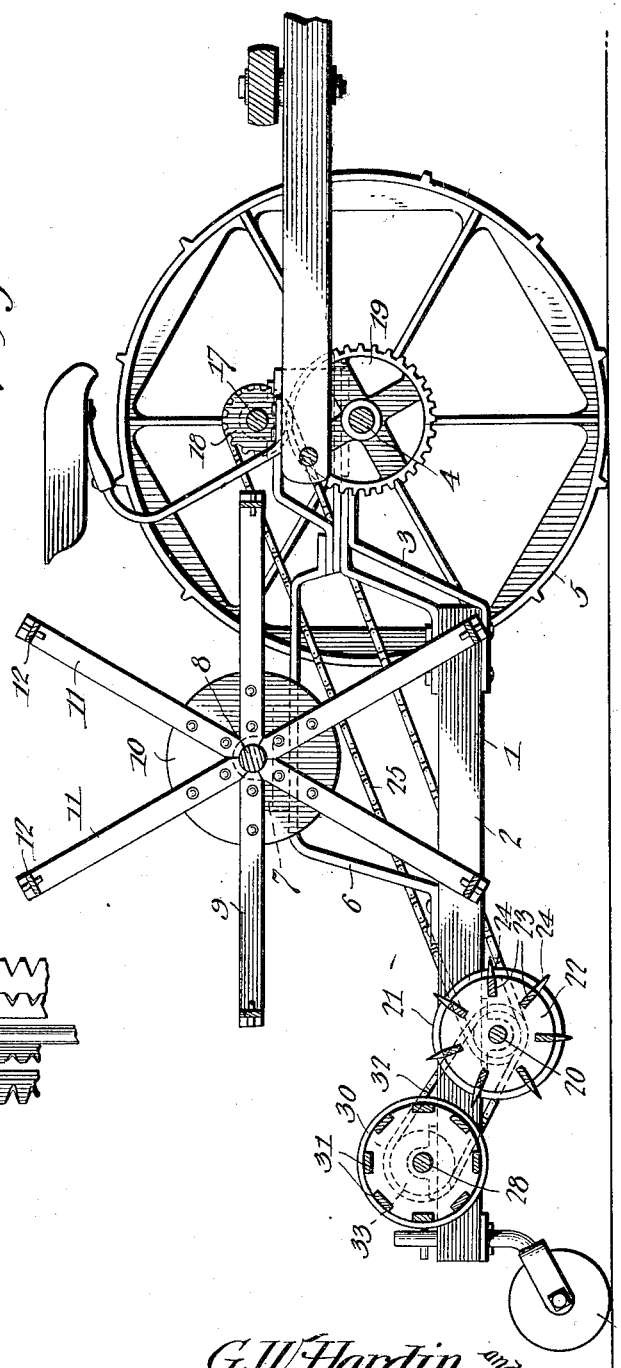
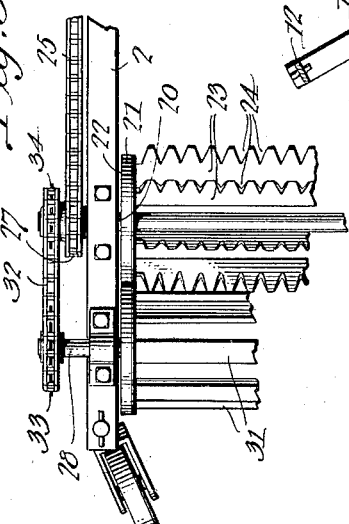
Witnesses
E. F. Stewart
Wm. Bagger
G. W. Hardin and
J. D. Mead, Inventors.
by C. A. Snow & Co.
Attorneys No. 738,795.

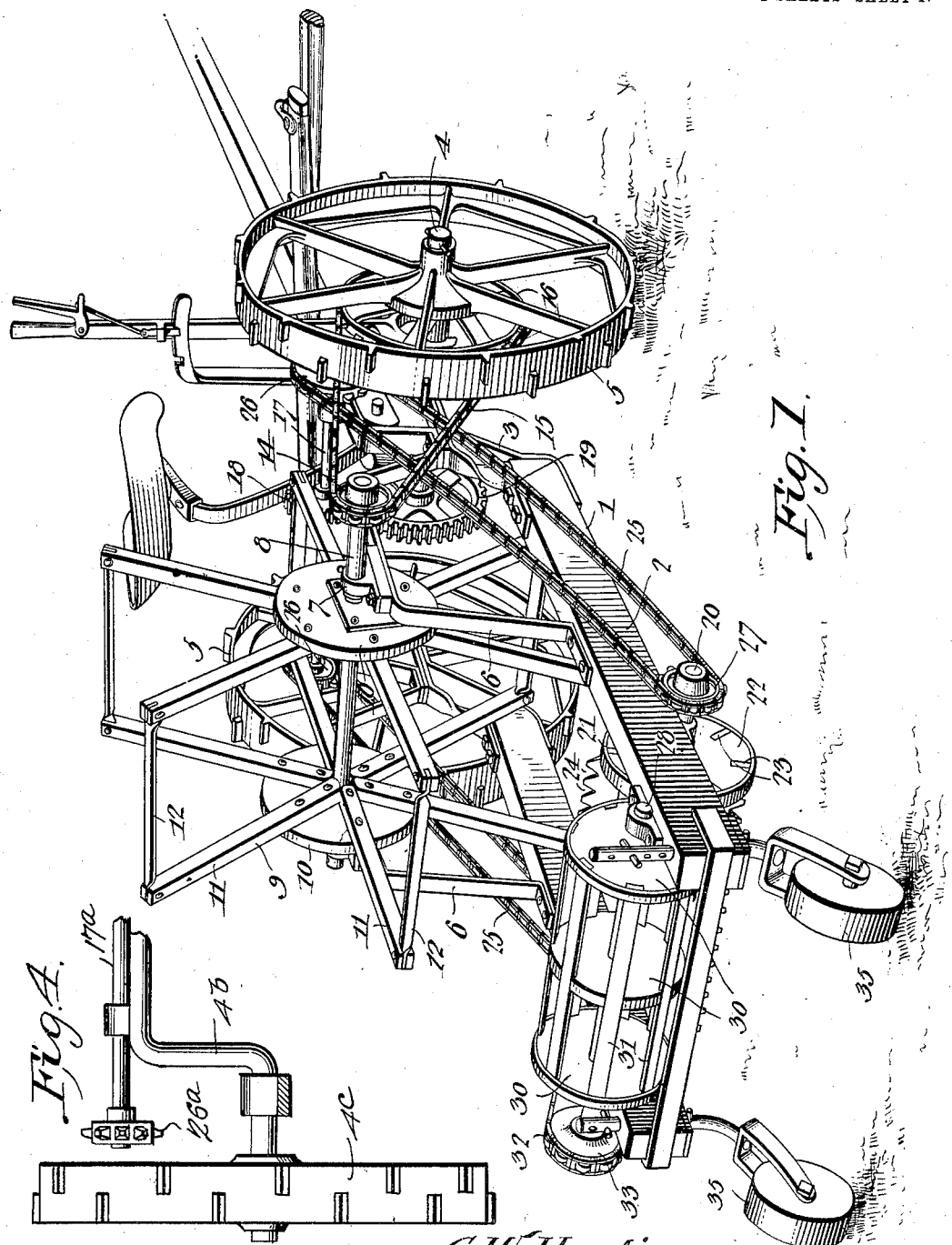

Patented September 15, 1903.

UNITED STATES PATENT OFFICE.

GEORGE W. HARDIN AND JOHN D. MEAD, OF PECAN GAP, TEXAS.

COTTON-STALK PULLER.

SPECIFICATION forming part of Letters Patent No. 738,795, dated September 15, 1903.

Application filed May 29, 1903. Serial No. 159,375. (No model.)

*To all whom it may concern:*

Be it known that we, GEORGE W. HARDIN, and JOHN D. MEAD, citizens of the United States, residing at Pecan Gap, in the county of Delta and State of Texas, have invented a new and useful Cotton-Stalk Puller, of which the following is a specification.

This invention relates to machines for pulling cotton-stalks; and it has for its object to provide a device of this class which shall possess superior advantages in point of simplicity, durability, and general efficiency.

With these and other ends in view the invention consists in the improved construction, arrangement, and combination of parts constituting a machine which comprises as its essential parts a frame supported upon wheels, a reel driven from the supporting-gears and adapted to operate upon the stalks, a pulling-cylinder against which the stalks are forced by the action of the reel and which operates in conjunction with the latter to pull or lift the stalks from the ground, and a discharge-cylinder which receives the pulled stalks and discharges them over the tail end of the machine, so as not to hinder the progress of the latter.

The invention further consists in the improved construction, arrangement, and combination of parts, which will be hereinafter fully described, and particularly pointed out in the claims.

In the accompanying drawings, Figure 1 is a perspective view of our improved cotton-stalk puller. Fig. 2 is a longitudinal vertical sectional view of the same. Fig. 3 is a detail plan view of a portion of the device, including a portion of the pulling and discharge cylinders. Fig. 4 is a detail view illustrating a modification.

Corresponding parts in the several figures are indicated by similar numerals of reference.

1 designates a frame, the side pieces 2 of which are provided near their front ends with upwardly-extending brackets 3, forming bearings for the axle 4, carrying the transporting-wheels 5, one or both of which are fast upon the axle or adapted to be connected therewith by clutch mechanism of ordinary construction, so as to cause the axle to revolve when the machine moves in a forward direction. The side pieces of the frame also support a pair of brackets 6, located in rear of the brackets 3 and supporting bearings 7, in which is journaled a shaft 8, carrying a reel 9 of ordinary construction, said reel being composed, essentially, of hub-plates 10, having radially-extending arms 11, connected by cross-bars 12. The detailed construction of this reel is unimportant and may be varied in any desired way within the scope of our invention. The bearings 7 of the reel are preferably made vertically adjustable, which may be readily effected in any suitable well-known manner, thereby enabling the reel to be raised or lowered, according to the character of the work that is to be performed.

The reel-shaft is provided at one end with a sprocket-wheel 14, connected by a chain 15 with a larger sprocket-wheel 16, mounted upon the axle of the machine adjacent to one of the transporting-wheels, or it may, if desired, be formed integrally with said transporting-wheel, motion being thus transmitted to the reel-shaft.

The brackets 3 at the front end of the machine are extended upwardly above the axle and support bearings for the cross-shaft 17, which is parallel to the axle and which is provided with a pinion 18, meshing with a spur-gear 19 upon the axle.

The side pieces of the frame are provided on their undersides, near their rear ends, with bearings for a shaft 20, carrying the pulling-cylinder 21. The latter is composed of a pair of heads 22, mounted upon said shaft 20 and connected by means of a plurality of blades 23, the edge of each of which is provided with a plurality of V-shaped notches 24, the edges of which are sharpened sufficiently to engage the stalks with which they come into contact, without, however, severing the said stalks. Any desired number of the blades 23 may be used, from six to eight being usually considered sufficient. The pulling-cylinder is driven from the shaft 17 by means of chains 25, connecting sprocket-wheels 26 upon said shaft 17 with sprockets 27 upon the shaft 20.

The rear ends of the frame-beams 2 2 are provided with bearings for a shaft 28, carrying a discharge-cylinder, which is composed of a plurality of disks 30, mounted upon said shaft and connected by means of slats 31.

This discharge-cylinder is run by means of a chain 32, connecting a sprocket-wheel 33 upon the shaft 28 with a sprocket 34 upon the shaft of the pulling-cylinder.

The extreme rear end of the frame is supported upon caster-wheels 35, which will enable the machine to be readily turned and guided in the desired direction.

From the foregoing description, taken in connection with the drawings hereto annexed, the operation and advantages of our invention will be readily understood by those skilled in the art to which it appertains.

When the machine, which is provided with draft appliances of ordinary construction, is propelled over the field, the revolving reel will engage the stalks and beat them in a rearward direction, as will be readily understood, the cross-bars of the reel engaging the stalks at no great distance above the ground, thus bringing the butt-ends of the stalks into contact with the rapidly-driven pulling-cylinder, the notched blades of which will engage the stalks close to the roots thereof and pull them forcibly out of the ground, the cross-bars of the reel serving to maintain the engagement of the stalks with the pulling-cylinder while being thus extricated. The pulling-cylinder will lift the extricated stalks until they pass into engagement with the discharge-cylinder, the continued action of the reel serving to throw the stalks rearwardly, so that they will not escape contact with the discharge-cylinder, but will be engaged by the latter and discharged from the tail end of the machine. The operation of this machine is continuous, and it will in a rapid and effective manner extricate the cotton-stalks from the ground and deposit them flat upon the field in a condition which enables them to be readily plowed under and which insures their rapid decay.

In Fig. 4 of the drawings has been shown a detail view illustrating a modification of our invention which we frequently desire to employ. By this modification instead of using a straight axle, as shown at 4, we employ a cranked axle $4^b$, upon which the transporting-wheels, one of which has been shown at $4^c$, are loose. The object of using the cranked axle is to so elevate the central portion of the latter as to permit the cotton-stalks to pass under the same without danger of being broken down. They will consequently be more effectively operated upon by the operating parts of our improved machine. The cranked portion of the axle supports a shaft $17^a$, corresponding to the shaft 17 illustrated in Fig. 1. This shaft $17^a$ carries sprocket-wheels at its ends, one of which has been shown at $26^a$, from which motion is transmitted to the shaft carrying the pulling-cylinder. The front part of the machine will obviously be slightly reorganized, so that motion shall be suitably transmitted from one of the transporting-wheels to the shaft $17^a$. Clutch mechanism will also be employed, whereby the parts may be thrown into and out of gear; but such clutch mechanism is old and well known, as are the means for transmitting motion, and these parts have accordingly been omitted from Fig. 4 of the drawings, which is merely for the purpose of showing the cranked axle which sometimes and preferably is to be used in connection with our invention.

It has been customary to beat the cotton-stalks down for the purpose of enabling the ground to be cultivated for future crops; but the beating down of the stalks has been not only a tedious and slow work, but it has been inefficient for the purpose intended. By our invention, which is simple and easily operated, the very best results may be attained with the least expense of time and energy.

We have in the foregoing described a simple and preferred construction of our invention; but we desire it to be understood that we do not thereby limit ourselves to the precise structural details herein set forth, but reserve the privilege of making any changes, alterations, and modifications which may be resorted to within the scope of our invention and without departing from the spirit or sacrificing the utility of the same.

Having thus described the invention, we claim—

1. In a stalk-puller, the combination of a pulling-cylinder, means for forcing the stalks into engagement with said pulling-cylinder, and a discharge-cylinder disposed in rear of said cylinder to receive the extricated stalks from the latter to carry them over the tail end of the machine.

2. In a stalk-puller, a pulling-cylinder having a plurality of blades provided with sharp-edged notches, in combination with a discharge-cylinder consisting of a slatted drum.

3. In a stalk-puller, the combination with a pulling-cylinder, of means for receiving the extricated stalks from the latter and carrying the said stalks over the tail end of the machine.

4. In a stalk-puller, the combination of a wheeled frame having an axle, a reel disposed in rear of the axle, a pulling-cylinder disposed below and in rear of the reel, a discharge-cylinder disposed in rear of and above the pulling-cylinder, and means for transmitting motion from the traction-wheels and the axle to the reel and the pulling-cylinder and from the latter to the discharge-cylinder.

In testimony that we claim the foregoing as our own we have hereto affixed our signatures in the presence of two witnesses.

GEORGE W. HARDIN.
JOHN D. MEAD.

Witnesses:
W. A. COCKRELL,
J. L. MCSWAIN.